(12) United States Patent
Koetz et al.

(10) Patent No.: US 11,122,930 B2
(45) Date of Patent: Sep. 21, 2021

(54) COOKING MANAGEMENT METHOD, FOOD PROCESSOR, AND SYSTEM FOR CARRYING OUT A COOKING OPERATION

(71) Applicant: Vorwerk & Co. Interholding GmbH, Wuppertal (DE)

(72) Inventors: Hendrik Koetz, Wetter (DE); Stefan Kraut-Reinkober, Leverkusen (DE); Andrej Mosebach, Bochum (DE); Mirco Pieper, Wuppertal (DE); Anton Reindl, Garmisch-Partenkirchen (DE); Christiane Stach, Radevormwald (DE); Wenjie Yan, Düsseldorf (DE); Sarah Werhahn, Zürich (CH)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 16/286,479

(22) Filed: Feb. 26, 2019

(65) Prior Publication Data
US 2019/0261812 A1  Aug. 29, 2019

(30) Foreign Application Priority Data
Feb. 27, 2018 (EP) .................................... 18159013

(51) Int. Cl.
*A47J 36/32* (2006.01)
*G05B 15/02* (2006.01)
*A47J 43/07* (2006.01)

(52) U.S. Cl.
CPC ............. *A47J 36/321* (2018.08); *A47J 36/32* (2013.01); *A47J 43/0716* (2013.01); *G05B 15/02* (2013.01)

(58) Field of Classification Search
CPC ....... A47J 36/321; A47J 43/0716; A47J 36/32; G05B 15/02; G05B 19/418; G05B 19/4185; G05B 2219/2643
See application file for complete search history.

(56) References Cited

U.S. PATENT DOCUMENTS 9,207,659 B1 * 12/2015 Sami .................. H04L 12/2829
10,444,723 B2 * 10/2019 Young ................. G05B 19/048
2006/0278093 A1 * 12/2006 Biderman ............... A47J 31/52
99/282

(Continued)

FOREIGN PATENT DOCUMENTS

DE    10 2015 103596 A1    9/2015
DE    10 2014 211 094 B3    4/2016

OTHER PUBLICATIONS

European Search Report, dated Jun. 12, 2018 corresponding European Application No. 18 159 013.4.

*Primary Examiner* — Charles R Kasenge
(74) *Attorney, Agent, or Firm* — Intellectual Property Law Group LLP

(57) ABSTRACT

The invention concerns a cooking management method (100) for planning a cooking process (200) of a kitchen machine (1) comprising the following steps: determining (105) an entertainment program (201) of an entertainment apparatus (2); determining (106) a planning interval (202) in which at least one user of the kitchen machine (1) is connected to the entertainment machine (2) to enjoy the entertainment program (201). The invention also concerns a food processor (1) and a system for carrying out a cooking operation (200).

20 Claims, 2 Drawing Sheets

(56) References Cited

U.S. PATENT DOCUMENTS

| | | | | |
|---|---|---|---|---|
| 2008/0103686 A1* | 5/2008 | Alberth | .................. | G01C 21/00 |
| | | | | 701/532 |
| 2010/0127854 A1* | 5/2010 | Helvick | .............. | H04L 12/2827 |
| | | | | 340/539.14 |
| 2010/0186600 A1* | 7/2010 | Lewis | ..................... | A47J 36/32 |
| | | | | 99/327 |
| 2011/0184812 A1* | 7/2011 | Stoulil | ................... | G06Q 30/02 |
| | | | | 705/14.66 |
| 2013/0092032 A1* | 4/2013 | Cafferty | .................... | F24C 7/08 |
| | | | | 99/325 |
| 2016/0309954 A1* | 10/2016 | Lentzitzky | .......... | H04L 12/2834 |
| 2017/0099988 A1* | 4/2017 | Matloubian | ......... | A47J 37/0664 |
| 2017/0139385 A1* | 5/2017 | Young | ................ | G09B 19/0092 |
| 2017/0345025 A1* | 11/2017 | Stoulil | ................... | G06Q 30/02 |

* cited by examiner

COOKING MANAGEMENT METHOD, FOOD PROCESSOR, AND SYSTEM FOR CARRYING OUT A COOKING OPERATION

CROSS-REFERENCE TO RELATED APPLICATION

This application claims priority to European application no. 18 159 013.4 filed on Feb. 27, 2018, which is hereby incorporated by reference in its entirety.

BACKGROUND OF THE INVENTION

1. Field of the Invention

The invention concerns a cooking management method for planning a cooking process of a food processor, a food processor, and a system for performing a cooking process according.

2. Background

It is well known that more and more processes of daily life are intertwined in order to improve efficiency and comfort, especially in private life. Many people would like to create more space for leisure activities or—despite a time-consuming job—still try to enjoy leisure time. Although nutritional awareness has become part of the public consciousness as a whole, a healthy way of cooking in everyday stress is often the first to be neglected due to time constraints. Therefore, it is desirable to integrate a cooking process as efficiently as possible into everyday life so that the user still has enough time for free space.

It is known from DE 10 2014 211 094 B4 that a household appliance can be connected to a television set and that operating noises can be matched to the behavior of the television. However, there can still be a high inhibition threshold for the user to prepare elaborate food, as he has to take care of the timing himself, obtain information about the duration of the recipe and the television program and finally coordinate these with each other.

SUMMARY

It is therefore an object of the present invention to at least partially eliminate previous disadvantages known from the state of the art. In particular, one object of the present invention is to simplify the integration of food preparation into a user's leisure activities and to improve it in terms of comfort and/or time efficiency.

The above object is solved by a cooking management method with the characteristics of claim 1, a food processor with the characteristics of claim 14, and a system for performing a cooking operation with the characteristics of claim 15.

Further characteristics and details of the invention result from the dependent claims, the description and the drawings. Features and details which have been described in connection with the cooking management method according to the invention naturally also apply in connection with the food processor according to the invention and/or the system according to the invention and vice versa in each case, so that with regard to the disclosure of the individual aspects of the invention mutual reference is or can always be made.

According to the invention, the cooking management method for planning the cooking process of a food processor comprises the following steps:

determining an entertainment program of an entertainment device, determining a planning interval in which at least one user of the food processor is at least partially connected to the entertainment device for enjoying the entertainment program, Create a planning of the cooking process depending on the planning interval.

The enjoyment of the entertainment program can preferably be understood to mean that the user uses the entertainment program, for example, to organize or even relax his leisure time or training or the like. In particular, the entertainment program is a function of the entertainment device. Preferably, the entertainment device is an electronic entertainment device. The entertainment device may, for example, include a television set, in particular a smart TV, a game console, a tablet, a computer, a fitness machine and/or the like. The planning interval can preferably be understood as a future or already started period of time. The planning interval can, for example, be linked to a time or an event. It is therefore conceivable that the planning interval corresponds to a start time of the entertainment program, which represents the event that triggers the planning interval. It is also conceivable that the event may include a commercial break during the entertainment program or the end of a football match. In particular, the planning interval can also reflect the time span in which the entertainment program is scheduled.

The cooking process can advantageously include a recipe process, in particular automated or partially automated. The recipe process can include various steps for preparing a dish using a recipe. Furthermore, the recipe process can be controlled directly by a control unit of the food processor or by an external server, e.g. connected to the food processor via the Internet. For this purpose, it can be provided that the user first determines a recipe for the cooking process, in particular selects one from an existing recipe collection.

The fact that the planning of the cooking process is created as a function of the planning interval has the advantage that the cooking process can be integrated efficiently and conveniently into the daily routine of a user and the user is supported in his time management. Thus, the planning of the cooking process can take place within the framework of the inventive cooking management method, in particular, depending on the planning interval, which in turn corresponds to the entertainment program. Particularly in combination with an at least partially automated food processor, individual steps of a recipe to be executed can be carried out or prepared. For example, it is conceivable that water is already heated so that the user can immediately add noodles at the end or during a break in the entertainment program to cook them. This in turn saves time heating the water when this step is performed in parallel with the entertainment program. It can also be possible to switch the food processor on and off at certain times. It is also conceivable, however, that the planning of individual steps or the entire recipe process is merely given to the user. The individual steps can be planned accordingly, e.g. during interruptions of the entertainment program or the like. For example, it can be pre-set by the user that he plans to use the entertainment program at a certain time so that the planning of the cooking process can take into account the entertainment program accordingly. However, it is also conceivable that the planning of the cooking process is only adapted after the entertainment program has been called up.

Preferably, an inventive cooking management procedure may provide that the entertainment program includes a streaming offer, a TV program, a computer game, a learning program and/or a radio program. A streaming service can be understood, for example, as a program offering of films, music, audio books and/or the like which is made available by an external streaming service, in particular via the Internet. It is conceivable that the user may call up the streaming service individually and that the planning of the cooking process may be adapted according to the streaming service. In particular, the entertainment program may thus be based on electronic media, in particular, which entertain and/or inform a user. Thus, the user has the possibility to use everyday entertainment media and to integrate the cooking process into the time schedule accordingly.

It is also conceivable that, in the case of a cooking management method in accordance with the invention, the planning interval may be determined by evaluating at least one source of information. Preferably, at least one source of information may include a user interface, an entertainment history, an electronic program guide (EPG), an Internet service and/or a user calendar. The evaluation may advantageously include receiving and/or processing data from the information source. Thus, for example, an information source of the entertainment device can be accessed in order to obtain, in particular, temporal data on the entertainment program. The entertainment history can include information about user behavior. It is conceivable, for example, that the entertainment history might contain a list of previously called entertainment programs. In particular, pattern recognition can be provided, by which certain habits of the user can be identified and thus anticipated for the future. If, for example, the entertainment history shows that the user regularly watches news programs, the news program can be scheduled in the cooking process without additional user input. It is also possible that the user calendar is used for evaluation, so that user appointments can also be included in the planning of the cooking process and/or the user can make his planning of the entertainment program available to the food processor or an external server for determining the planning interval using the user calendar, for example. An electronic program guide may preferably provide access to a TV program, in particular without the need to connect to the Internet. The use of an Internet service as a source of information also has the advantage that complex data relationships can be transmitted and/or, for example, services of providers on the Internet can be taken into account when determining the planning interval. Other sources of information can include a live blog on the Internet, online TV magazines and/or hard disk recorders.

Preferably, a cooking management method according to the invention may provide that the planning of the cooking process includes the determination of a starting time for the start of the cooking process. Preferably, the start time can be output as a suggestion and/or the cooking process can be started automatically at the start time. So, it is conceivable that the cooking process should immediately follow the end of the entertainment program and the start time is planned accordingly. If the start time is output as a default, it is possible, for example that the user changes the start time. Furthermore, it is conceivable that a selection of several start times is output, which are determined according to different criteria using the planning interval and/or entertainment program, so that the user can select one of the start times. Thus, by suggesting a starting time, a user can be supported in planning the cooking process and at the same time be given a high degree of individual freedom in execution. If the cooking process is started automatically at the start time, a user can also be free of a further work step, so that it is not or only to a small extent necessary for the user to take care of the cooking process at least at the start of the cooking process. In particular, the start time can also be linked to certain events, such as the termination of the entertainment program by the user, a commercial break, or the like.

Advantageously, in an inventive cooking management method, scheduling the cooking process can also include determining an end time to complete the cooking process.

Preferably, the end time can be output as a suggestion and/or the cooking process can be automatically completed at the end time. It is conceivable that the cooking process should be completed at a certain phase of the program, such as immediately at the end of the entertainment program, so that the end time is planned accordingly. Furthermore, it is conceivable that the end time is planned at the beginning of a program break, so that the user can for example, consume food during the halftime break of a football game.

Further, in an inventive cooking management method, it may be provided that scheduling of the cooking process comprises determining at least one intermediate stage of the cooking process in which user interaction is required for further performance of the cooking process. In particular, the user can be automatically notified of an actual and/or scheduled attainment of at least one intermediate stage. This means that the cooking process can also be advantageously integrated into the user's schedule if at least one user interaction is necessary in between. For example, it is conceivable that certain steps in a recipe sequence may be performed automatically by the food processor, but it is necessary for the user to add ingredients in the meantime. This can be represented by the intermediate level, which, for example, can correspond to a program interruption or can be provided between two planned entertainment programs. The notification may preferably include the sending of a message to a mobile device, such as a smartphone or tablet, by the user and/or via an output unit, for example by playing a notification tone and/or displaying the notification on a display of the food processor. In particular, the notification may include a pre-announcement, so that, for example, the user is informed before the start of the entertainment program that the addition of an additional ingredient is required during the first advertising break.

In the context of the invention, it may also be provided that the determination of the planning interval and/or the preparation of the planning of the cooking process takes place as a function of navigation data, in particular the navigation data comprising traffic data and/or a location of the at least one user. The user's location can, for example, contain GPS information, in particular a GPS position, which can be made available for planning the cooking process. From the location and/or the navigation data, it can then be advantageously determined when the user will be on site to carry out further steps of the recipe process and/or to start the entertainment program. Traffic data may be general traffic data comprising the route and/or map data to be covered by the user or several users. Traffic data may preferably provide information on current traffic, public transport delays and/or the like.

Preferably, the navigation data may include public traffic data in a cooking management method according to the invention. In particular, public transport data can be obtained from a public information system. The public information system may, for example, provide map data, public transport connections and/or other navigation data. In particular, public traffic data may be provided by third party services and/or accessed over the Internet. This will ensure a high level of suitability of the data, in particular when the public transport data are regularly updated and/or retrieved in real time from the public information system. The public information system may preferably include an Internet platform, traffic radio, timetables and/or the like.

In the context of the invention, it is also conceivable that the determination of the planning interval and/or the creation of the planning of the cooking process is carried out as a function of activity data, in particular wherein the activity data are used for at least partial determination of the navigation data. Activity data should preferably include information on the activities and/or whereabouts of the user. In particular, the activity data may include data on events visited by the user, information on school and holiday days, and the like. It is therefore conceivable that, in addition to the entertainment program, further program items can be taken into account in the user's daily routine in order to embed the preparation of the food into the daily routine as efficiently as possible. This allows the user to conveniently take over a part of his appointment planning or to coordinate it for him. When linking the activity data with the navigation data, it is also conceivable that an arrival and departure route to events can also be integrated.

By integrating additional data, in particular navigation data and/or activity data, the planning of the cooking process can be synchronized continuously. This means, for example, that the planning of the cooking process can be influenced to determine whether the cooking process is completed before or after the entertainment program. If the user is delayed, for example, he can be rescheduled from a cooking process initially planned before the entertainment program to a subsequent or parallel cooking process.

Furthermore, in the case of an inventive cooking management method, it can be provided that the activity data and/or the navigation data and/or different entertainment programs are assigned to a plurality of users, the planning interval and/or the planning of the cooking process arranged for a user community. Thus, it is conceivable that the planning of the cooking process is carried out for a family, for example, whereby each family member can be assigned their own activity data, their own navigation data and/or their own entertainment programs. In particular, the meal times of the individual family members can be coordinated taking into account the respective leisure activities, so that the family members can eat together and/or the kitchen machine is available to everyone in a certain time window. Preferably, the activity data, navigation data and/or entertainment program may be linked to different user accounts, with multiple user accounts forming a user community. It is also possible for multiple user accounts to be linked to a particular entertainment program or to an event associated with that program. For example, it is conceivable that an event could be planned in the form of a shared international game evening and that several user accounts would be linked to the event, whereby the planning of the cooking process would be coordinated according to the data of the users. For example, the arrival of individual users can be taken into account. Thus, through the cook management process, social interaction can be simplified in relation to joint planning.

Furthermore, it is conceivable that, in the case of a cooking management method in accordance with an invention, the cooking management method comprises the following steps:
Establish an appliance connection between the kitchen appliance and the entertainment appliance,
Get information about the entertainment program from the entertainment device via the device connection.

The appliance connection may preferably be a direct or indirect connection between the food processor and the entertainment appliance. For example, the food processor can be wired or wirelessly connected or paired to the entertainment device. In particular, the device connection may include an Ethernet connection, Bluetooth connection, WLAN connection and/or the like. This means that required data can be retrieved directly from the entertainment device, preferably by the food processor. For example, it may not be necessary to connect the food processor or entertainment device to an Internet connection. In particular, the user comfort can also be increased by an intuitively operable coupling.

The invention may also provide that the cooking management method includes the following steps:
Establish a network connection between the food processor and a server,
retrieving data from the server, the data comprising information about the entertainment programme and/or the navigation data.

The network connection may preferably include an Internet connection, LAN connection and/or WLAN connection. In particular, the food processor may have a network interface for establishing the network connection with the server. The entertainment device may have another network interface to provide data to the entertainment program. However, it is also possible that the data for the entertainment program is provided by the server while the entertainment device is not connected to the Internet. This is conceivable, for example, when retrieving program information about a TV program if the data for the TV program is provided by the server, but a TV set can receive the TV program independently of an Internet connection.

Preferably, in an inventive cooking management method, determining the entertainment program may include at least one of the following steps:
Gain a selection of the entertainment program by the at least one user,
Enabling at least one user to influence the planning of the cooking process.

It is conceivable, for example, that the user would like to change the planning of the cooking process again after creation and influence it, in particular via a user interface. The corresponding control signal can be generated by the user interface depending on the user input. By selecting the entertainment program by at least one user, it is not necessary, for example, to record and evaluate an entertainment history so that computing and storage capacity can be reduced. In addition, the user's ability to interact with the food processor may improve user comfort, especially if the user can intervene in the cooking management process at any time in order to take into account individual wishes regarding the planning of the cooking process.

According to another aspect of the invention, a kitchen machine is claimed to prepare food. The food processor has a control unit for electronic data processing. Furthermore, the control unit can be used to initiate a cooking management method in accordance with the invention, in particular to carry it out. The food processor can be advantageously an electromotive kitchen appliance, by which a cooking process can be carried out at least partially automatically. For this purpose, the kitchen appliance may comprise at least an agitator, a scale (for weight measurement) and/or a heating element to automatically mix and/or cook food. The initiation of the cooking management process can preferably be understood to mean that the cooking management process is triggered or started at the food processor. The further steps of the process can be carried out on the kitchen appliance itself or on an external server which is in communication with the kitchen appliance, for example via a network connection. In particular, it is also conceivable that the cooking management procedure may be carried out partly on the kitchen machine and partly on the server. If steps of the procedure are executed on the server, computing and storage capacity can be saved so that the control unit can be small. Furthermore, processing on a server can ensure that the processing steps and/or data are highly up-to-date, so that user comfort can be further improved. In addition, a food processor incorporating an invention has the same advantages as those described in detail in relation to a cooking management method incorporating an invention.

According to another aspect of the invention, a system for performing a cooking process is required. The system comprises a food processor, in particular according to the invention food processor, for preparing food and a server which can be connected to the food processor. Through the server, a cook management procedure according to the invention is at least partially or completely feasible. Thus, a system conforming to the invention has the same advantages as those described in detail with regard to a cooking management method conforming to the invention and/or a food processor according to the invention. The communication connection may preferably include a network connection, in particular an Internet connection.

BRIEF DESCRIPTION OF THE DRAWINGS

Further measures to improve the invention result from the following description of some embodiments of the invention, which are shown schematically in the figures. All features and/or advantages resulting from the claims, the description or the drawings, including construction details, spatial arrangements and process steps, may be essential to the invention both in themselves and in various combinations. It should be noted that the figures are only descriptive and are not intended to restrict the invention in any way. It is shown:

DETAILED DESCRIPTION OF SPECIFIC EMBODIMENTS

In the following figures, the identical reference signs are used for the same technical characteristics, even for different embodiments.

Figure 1:
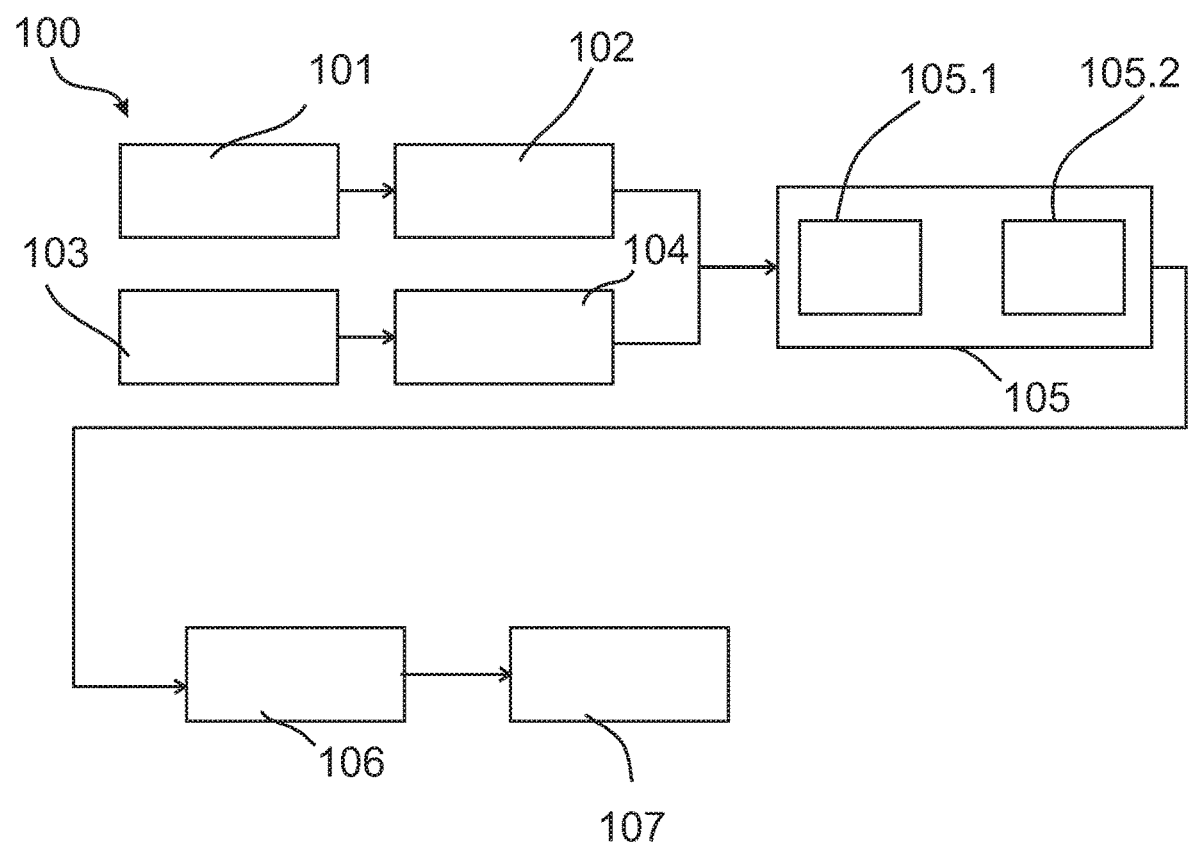
FIG. 1 a cooking management method according to the invention in a schematic representation of the process steps in a first embodiment, FIG. 2 a time schedule of the inventive cooking management method of the first embodiment in schematic representation, FIG. 3 a system according to the invention for the execution of a cooking management method according to the invention in a schematic representation in a further embodiment, FIG. 4 data provided to a kitchen appliance according to the invention in a schematic representation in another embodiment, FIG. 5 data provided to a kitchen appliance according to the invention in a schematic representation in another embodiment.

FIG. 1 shows a cooking management method 100 according to the invention in a schematic representation of the process steps in a first embodiment. The cooking management method 100 comprises establishing 101 a device connection 30 between food processor 1 and an entertainment device 2 and retrieving information 102 via an entertainment program 201 from the entertainment device 2. In addition or alternatively, it may be provided that a compile 103 of a network connection 31 of the food processor 1 is established with a server 3 and 104 of data 20 is retrieved from the server 3. The data 20 comprises in particular information via an entertainment program 201 and/or navigation data 21 of a user. This allows the information about the entertainment program 201 to be obtained from food processor 1 directly via device connection 30 from entertainment machine 2 or via network connection 31. Preferably afterwards a purpose of the entertainment program 201 of the entertainment device 2, which the user would like to use, is made. This may include, for example, a user interaction where receiving 105.1 of a selection by the user and/or receiving 105.2 of an influence on the planning of a cooking operation 200 may be provided. The user of food processor 1 can thus communicate his desired entertainment program 201 to food processor 1, so that the further steps of the cooking management method 100 can be used to orient the preparation of food to entertainment program 201, at least with regard to time planning. Based on the entertainment program 201, there is further provided a determining 106 of a planning interval 202 during which the user is at least partially bound to the entertainment device 2 for enjoyment of the entertainment program 201. For example, it is conceivable that information on interruptions to entertainment program 201 may be extracted from the selection of entertainment program 201. In particular, the planning interval 202 can take into account several maintenance programs 201 with an idle in the meantime. Finally, depending on the planning interval 202, a planning of the cooking process 200 is created 107.

Figure 2:
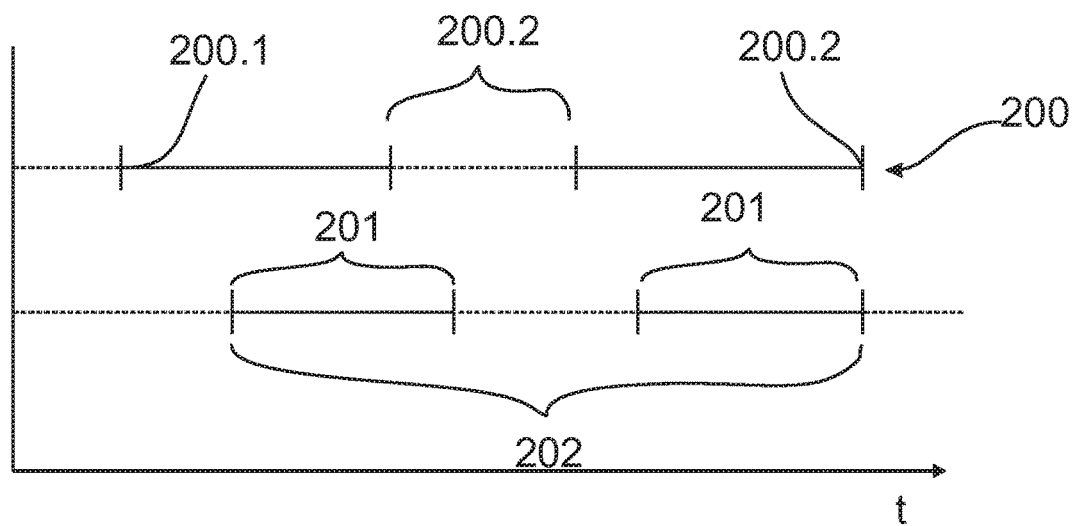

FIG. 2 shows a schematic representation of a time planning over a time t, wherein the planning interval 202 is oriented to two entertainment programs 201 which the user has selected. Depending on the planning interval 202, a start time 200.1 is then created for the cooking process 200, at which preferably the first step for preparing a meal according to a predefined recipe is carried out. In addition, an intermediate level 200.2 is planned, in which a user interaction is necessary, in which the user is to add ingredients to food processor 1, for example. Intermediate level 200.2 was set correspondingly to the time between entertainment programs 201, so that intermediate level 200.2 is already reached when the first entertainment program 201 ends, but the user has sufficient time to perform the user interaction. Furthermore, an end time of 200.2 is planned, which corresponds to the end of the second entertainment program 201, so that the user can eat the finished food afterwards. Thus an efficient and comfortable procedure is created, which integrates the cooking process 200 into the everyday life, in particular into the leisure time of the user. Preferably, additional data 20 can be used to determine 106 of the planning interval 202 and/or 107 of the planning of the cooking process 200.

Figure 3:
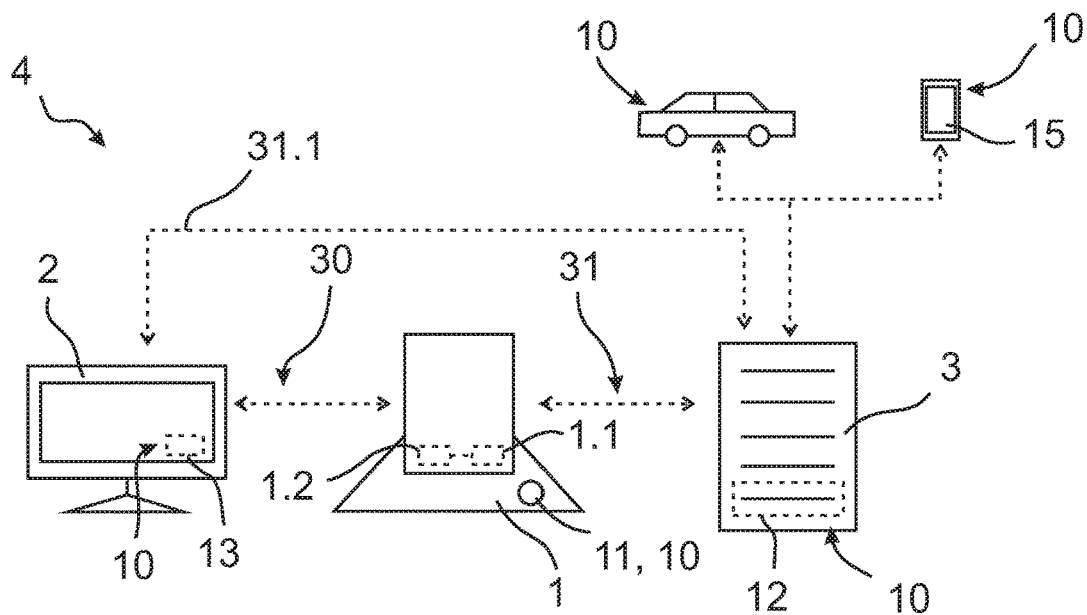

FIG. 3 shows a system according to invention 4 showing a food processor 1 and a server 3 in a further embodiments in schematic representation. The food processor 1 is in communication connection with an entertainment device 2 via a device connection 30 and with the server 3 via a network connection 31. Furthermore, the food processor 1 has a communication interface 1.1 to establish the appliance connection 30 and/or the network connection 31. Finally, via the communication interface 1.1, a control unit 1.2 of kitchen machine 1 receives data 20, which can contain, for example, information about an entertainment program 201, in order to initiate or carry out a cooking management method 100 according to the invention, in particular according to the first embodiment. It may be provided that only some process steps are carried out by food processor 1, while others are carried out on server 3. In order to obtain information about the entertainment program 201 for planning the cooking process 200, various information sources 10 are accessible via the device connection 30 and/or the network connection 31. Thus, the entertainment device 2 provides an electronic program guide 13, which provides a selection of possible entertainment programs 201 and/or temporal information about these entertainment programs 201. A further source of information 10 comprises a user interface 10 on the food processor 1 for manual input and/or selection of the desired entertainment program 201. Furthermore, the server 3 provides an entertainment history 12 which is linked in particular to a user account and in which data of most recently viewed entertainment programs are stored. This ensures to calculate with a certain probability an entertainment program 201 that is likely to be desired by the user. In particular, entertainment device 2 is also in communication with server 3 via a further network connection 31.1, so that server 3 can directly determine information about the entertainment programs 201. Furthermore, the server can communicate with other sources of information 10, such as a vehicle and/or a mobile device, such as a smartphone, of the user. For example, a user calendar 15 can be made available via the mobile device, via which activity data 24 can be taken into account when planning the cooking process 200. Navigation data 21 can also be provided via the vehicle, for example, which can also be processed for planning the cooking process 200.

Figure 4:
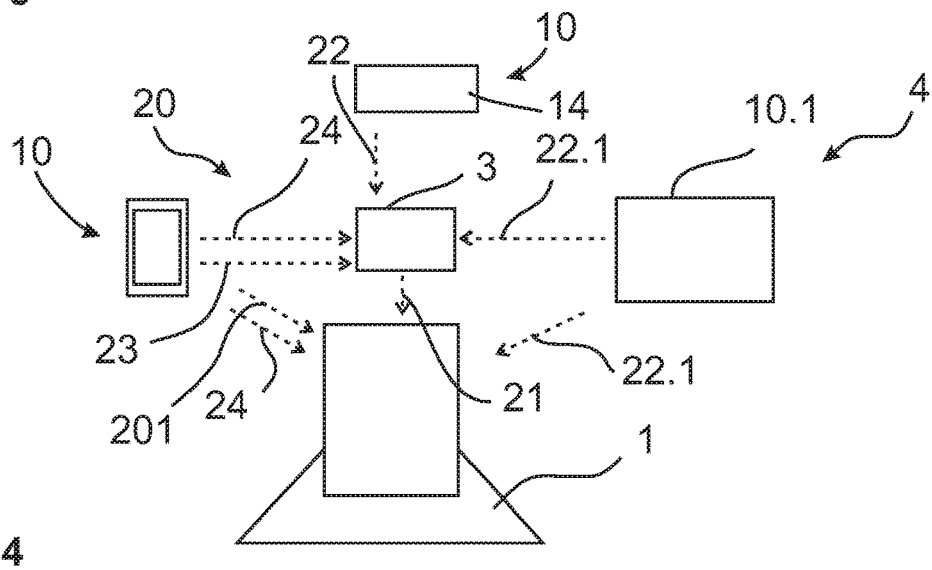

FIG. 4 shows a system 4 with a food processor 1 in another embodiment in schematic form. The food processor 1 receives data from 20 different information sources 10, which are taken into account in the planning of a cooking process 200. Activity data 24 on leisure activities, such as theatre visits or the like, of a user with a server 3 and/or the food processor 1 is exchanged via an information source 10 in the form of a smartphone of the user. Furthermore, the user can communicate a desired entertainment program 201 via the smartphone of kitchen machine 1 and/or server 3. In addition, Server 3 receives a location 23 of the user via the smartphone in order to be able to compare this with traffic data 22, which are obtained via an Internet service 14, and public traffic data 22.1, which are obtained from a public information source 10.1. These data 22, 22.1, 23 can be bundled and/or further processed by server 3 in order to make navigation data 21 of the user available to the food processor 1. This can be used, for example, to determine the user's arrival time and to compare, for example, whether sufficient time remains for cooking process 200 before the start of entertainment program 201, or whether cooking process 200 should take place after and/or during entertainment program 201.

Figure 5:
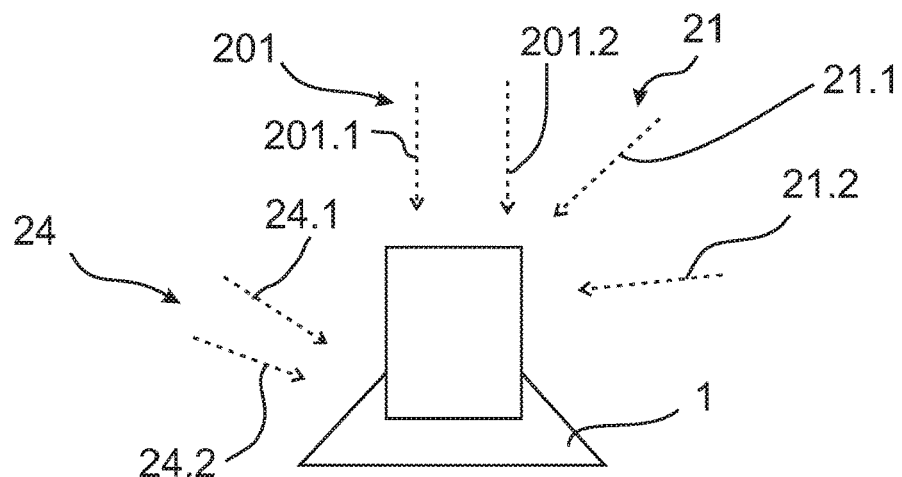

FIG. 5 shows a food processor 1 in another embodiment. The food processor 1 receives data 20 from multiple users, whereby, for example, navigation data 21.1, 21.2, activity data 24.1, 24.2 assigned to each user and/or entertainment programs 201.1, 201.2 desired by the individual users can be transmitted. This allows a cooking management to be carried out as efficiently as possible for a user community and to be adapted to the needs of the individual users in such a way that they do not collide with the needs of other users at all or only to a minor extent.

The preceding explanation of the embodiment describes the present invention exclusively in the context of examples. Of course, individual features of the embodiments can be freely combined with each other, if technically reasonable, without leaving the scope of the present invention.

REFERENCE CHARACTER LIST

1 Food processor
1.1 Communication interface
1.2 Control unit
2 Entertainment device
3 Server
4 System
10 Information source
10.1 Public information source
11 User interface
12 Entertainment history
13 Electronic program guide
14 Internet service
15 User calendar
20 Dates
21 Navigation data
22 Traffic data
22.1 Public traffic data
23 Location
24 Activity data
30 Device connection
31 Network connection
31.1 Other network connection
100 Cooking management method
101 Producing of 30
102 Retrieving of information
103 Production of 31
104 Requests of 20
105 Determining of 201
105.1 Getting a selection of 201
105.2 Getting an influence on planning of 200
106 Determining of 202
107 Creating the planning of 200
200 Cooking process
200.1 Start time
200.2 Intermediate stage
200.3 Event time
201 Entertainment program
202 Planning interval time

What is claimed is:

1. A cooking management method for planning a cooking process of a food processor configured for at least partly preparing a dish using a recipe, the method comprising the following steps:

determining an entertainment program of an entertainment apparatus at least by a control unit of the food processor or by a server, determining a planning interval in which at least one user of the food processor is at least partially connected to the entertainment apparatus for enjoying the entertainment program at least by the control unit of the food processor or by the server, creating a planning of the cooking process as a function of the planning interval at least by the control unit of the food processor or by the server, wherein the determination of at least the planning interval or the creation of the planning of the cooking process occurs as a function of activity data, so that in addition to the entertainment program, further program items of the user's daily routine are taken into account.

2. The cooking management method according to claim 1, wherein
the entertainment program comprises at least a streaming offer, a TV program, a computer game or a radio program.

3. The cooking management method according to claim 1, wherein
the determination of the planning interval by evaluating at least one information source.

4. The cooking management method according to claim 3, wherein the at least one information source comprises at least a user interface, an entertainment
history, an electronic program guide, an Internet service or a user calendar.

5. The cooking management method according to claim 1, wherein
the preparation of the planning of the cooking process comprises determining a starting time for starting the cooking process.

6. The cooking management method according to claim 5, wherein
the starting time being output as at least a suggestion or the cooking process being started automatically at the starting time.

7. The cooking management method according to claim 1, wherein
the preparation of the planning of the cooking process comprises the determination of an end time for completing the cooking process.

8. The cooking management method according to claim 7, wherein
the end time being output as at least a suggestion or the cooking operation being automatically completed at the end time.

9. The cooking management method according to claim 1, wherein the creation of the planning of the cooking process comprises the determination of at least one intermediate stage of the cooking process in which user interaction is required for the further execution of the cooking process.

10. The cooking management method according to claim 9, wherein the user is automatically notified of at least an actual or scheduled attainment of the at least one intermediate stage.

11. The cooking management method according to claim 1, wherein the determination of at least the planning interval or the creation of the planning of the cooking process occurs as a function of navigation data.

12. The cooking management method according to claim 11, wherein the navigation data comprising at least traffic data or a location of the at least one user.

13. The cooking management method according to claim 11, wherein
the navigation data comprise public traffic data.

14. The cooking management method according to claim 1, wherein at least the activity data, navigation data or different entertainment programs are assigned to a plurality of users, wherein at least the planning interval being determined pr the cooking process being planned for a user community.

15. The cooking management method according to claim 1, wherein the cooking management method comprises the following steps:
establishing a device connection between the food processor and the entertainment apparatus,
retrieving information about the entertainment program from the entertainment apparatus via the device connection.

16. The cooking management method according to claim 1, wherein
the cooking management method comprises the following steps:
establishing a network connection between the food processor and a server,
retrieving data from the server, the data comprising information about at least the entertainment program or the navigation data.

17. The cooking management method according to claim 1, wherein
determining of the entertainment program comprises at least one of the following steps:
receiving a selection of said entertainment program by said at least one user,
obtaining an influence of the planning of the cooking process by the at least one user.

18. A food processor for preparing food,
having a control unit for electronic data processing, the food processor configured for at least partly Preparing a dish using a recipe,
wherein a cooking management method for planning a cooking process of a food processor can be initiated by the control unit, said cooking management method comprising the following steps:
determining an entertainment program of an entertainment apparatus at least by the control unit of the food processor or by a server,
determining a planning interval in which at least one user of the food processor is at least partially connected to the entertainment apparatus for enjoying the entertainment program at least by the control unit of the food processor or by the server,
creating a planning of the cooking process as a function of the planning interval at least by the control unit of the food processor or try the server,
wherein the determination of at least the planning interval or the creation of the planning of the cooking process occurs as a function of activity data, so that in addition to the entertainment program, further program items of the user's daily routine are taken into account.

19. A system for performing a cooking process comprising:
a food processor for preparing food, configured for at least partly preparing a dish using a recipe,
a server which can be brought into communication connection with the food processor, wherein
a cooking management method for planning a cooking process of a food processor can be carried out at least partially by the server, said cooking management method comprising the following steps:
determining an entertainment program of an entertainment apparatus at least by a control unit of the food processor or by the server,
determining a planning interval in which at least one user of the food processor is at least partially connected to the entertainment apparatus for enjoying the entertainment program at least by the control unit of the food processor or by the server,
creating a planning of the cooking process as a function of the planning interval at least by the control unit of the food processor or by the server,
wherein the determination of at least the planning interval or the creation of the planning of the cooking process occurs as a function of activity data, so that in addition to the entertainment program, further program items of the user's daily routine are taken into account.

20. A cooking management method for planning a cooking process of a food processor configured for at least partly preparing a dish using a recipe, the method comprising the following steps:
determining an entertainment program of an entertainment apparatus at least by a control unit of the food processor or by a server,
determining a planning interval in which at least one user of the food processor is at least partially connected to the entertainment apparatus for enjoying the entertainment program at least by the control unit of the food processor or by the server,
creating a planning of the cooking process as a function of the planning interval at least by the control unit of the food processor or by the server,
wherein the determination of at least the planning interval or the creation of the planning of the cooking process occurs as a function of activity data, so that in addition to the entertainment program, further program items of the user's daily routine are taken into account, wherein the planning interval is determined by evaluating at least one source of information, that includes an entertainment history, wherein a pattern recognition is provided, by which certain habits of the user can be identified and thus anticipated for the future.

* * * * *